(12) United States Patent
Goorman et al.

(10) Patent No.: US 12,531,504 B2
(45) Date of Patent: Jan. 20, 2026

(54) SYSTEM AND METHOD FOR MOUNTING A SOLAR PANEL ONTO A SUBSTANTIALLY FLAT MOUNTING SURFACE

(71) Applicant: Enstall Europe B.V., Deventer (NL)

(72) Inventors: Johannes Sander Goorman, Deventer (NL); Maarten Alexander Smit, Deventer (NL); Jan-Floris de Graaf, Deventer (NL)

(73) Assignee: Enstall Europe B.V., Deventer (NL)

( * ) Notice: Subject to any disclaimer, the term of this patent is extended or adjusted under 35 U.S.C. 154(b) by 0 days.

(21) Appl. No.: 18/380,272

(22) Filed: Oct. 16, 2023

(65) Prior Publication Data

US 2024/0039457 A1    Feb. 1, 2024

Related U.S. Application Data

(63) Continuation of application No. 16/793,352, filed on Feb. 18, 2020, now Pat. No. 11,811,355.

(30) Foreign Application Priority Data

Feb. 14, 2020  (EP) ..................................... 20157504

(51) Int. Cl.
*H02S 20/24* (2014.01)
*H02S 30/10* (2014.01)
*H02S 30/20* (2014.01)

(52) U.S. Cl.
CPC .............. *H02S 20/24* (2014.12); *H02S 30/10* (2014.12); *H02S 30/20* (2014.12)

(58) Field of Classification Search
CPC .......... H02S 20/30; H02S 20/23; H02S 20/24; H02S 30/10; H02S 30/20; H02S 10/40; F24S 2025/02; F24S 2025/012; F24S 25/13; F24S 25/16
See application file for complete search history.

(56) References Cited

U.S. PATENT DOCUMENTS

| 2011/0260027 A1 | 10/2011 | Farnham, Jr. |
| 2012/0031862 A1 | 2/2012 | Belikoff et al. |
| 2013/0112248 A1 | 5/2013 | McPheeters |

(Continued)

FOREIGN PATENT DOCUMENTS

| DE | 3727892 A1 * | 3/1989 | ............. F24S 30/20 |
| DE | 202012001526 U1 * | 5/2012 | ............. F24J 2/5233 |

(Continued)

OTHER PUBLICATIONS

DE-202012001526-U1 English machine translation (Year: 2012).*
DE-3727892-A1 English machine translation (Year: 1989).*
DE-202016003834-U1 English machine translation (Year: 2016).*

*Primary Examiner* — Andrew J Golden
(74) *Attorney, Agent, or Firm* — The Webb Law Firm

(57) ABSTRACT

The invention relates to a system and a method for mounting at least one solar panel on a substantially flat mounting surface. The system comprises thereto a base element, a support structure configured for supporting at least part of at least one solar panel, which is connected to the base element and wherein the support structure comprises a retaining element for retaining at least part of an upper edge of the solar panel and a clamping element configured for clampingly engaging at least part of a lower edge the solar panel.

21 Claims, 12 Drawing Sheets

(56) References Cited

U.S. PATENT DOCUMENTS

| | | |
|---|---|---|
| 2013/0136531 A1 | 5/2013 | Kobayashi |
| 2014/0083504 A1* | 3/2014 | Kuo .................. H02S 20/24 |
| | | 136/259 |
| 2014/0102996 A1 | 4/2014 | Pelman |
| 2014/0109953 A1 | 4/2014 | Aulich |
| 2014/0224165 A1 | 8/2014 | Veloso et al. |
| 2014/0360111 A1 | 12/2014 | Kuan |
| 2015/0101996 A1 | 4/2015 | Nayar |
| 2015/0236636 A1* | 8/2015 | Sade .................. H02S 20/32 |
| | | 136/246 |
| 2016/0149535 A1 | 5/2016 | Chavez |
| 2016/0190979 A1* | 6/2016 | Wildes .............. H02S 20/24 |
| | | 136/251 |
| 2016/0261223 A1 | 9/2016 | De Vogel et al. |
| 2016/0282018 A1 | 9/2016 | Ash et al. |
| 2018/0026577 A1 | 1/2018 | Gaveau et al. |
| 2019/0006982 A1 | 1/2019 | Pretorius et al. |
| 2019/0222169 A1 | 7/2019 | Yang et al. |

FOREIGN PATENT DOCUMENTS

| | | |
|---|---|---|
| DE | 102014106800 A1 | 8/2015 |
| DE | 202016003834 U1 * | 9/2016 |
| DE | 202018103248 U1 | 8/2018 |
| EP | 2836770 A2 | 2/2015 |
| WO | 02073703 A1 | 9/2002 |
| WO | 2013153200 A2 | 10/2013 |

* cited by examiner

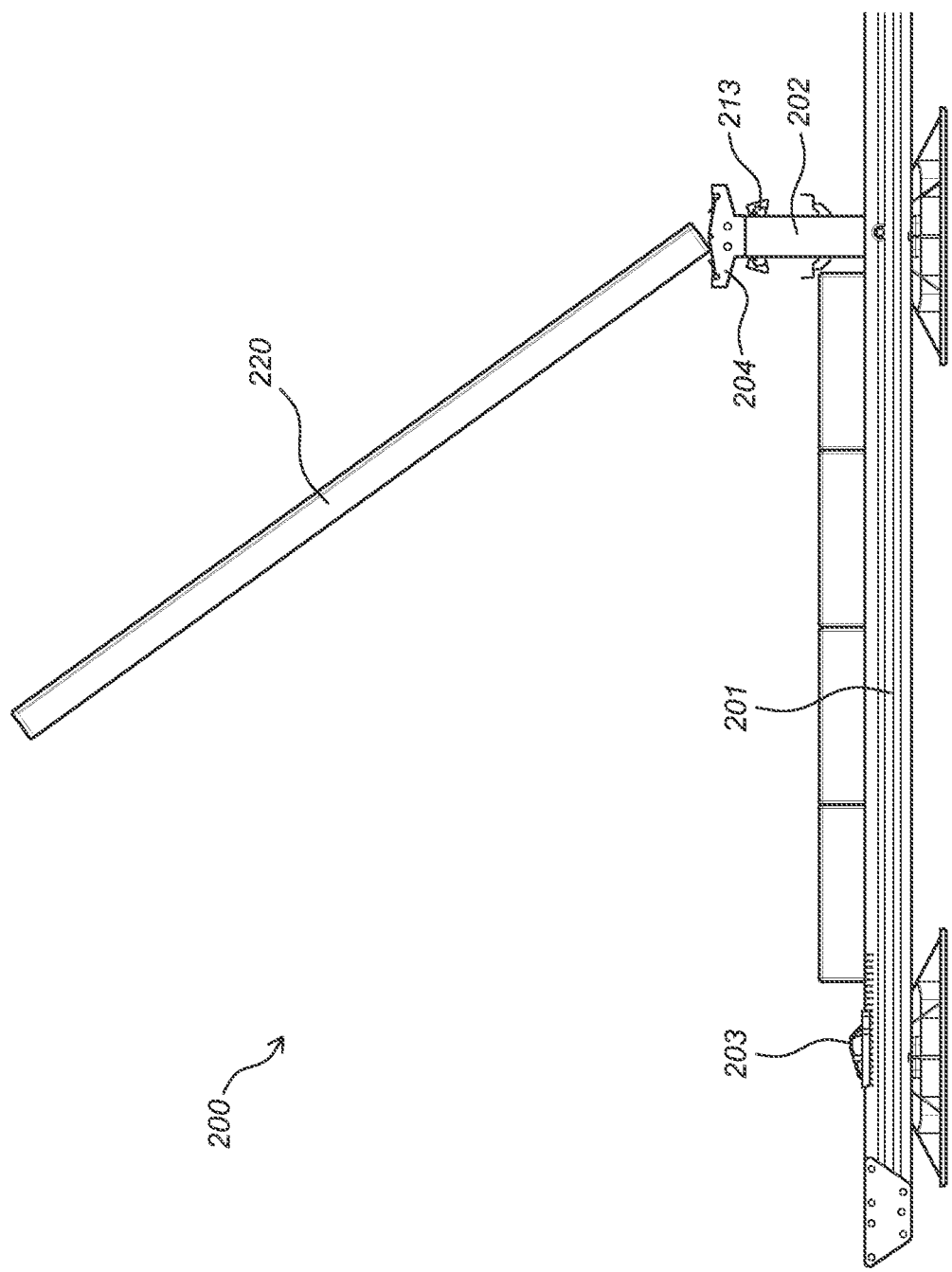

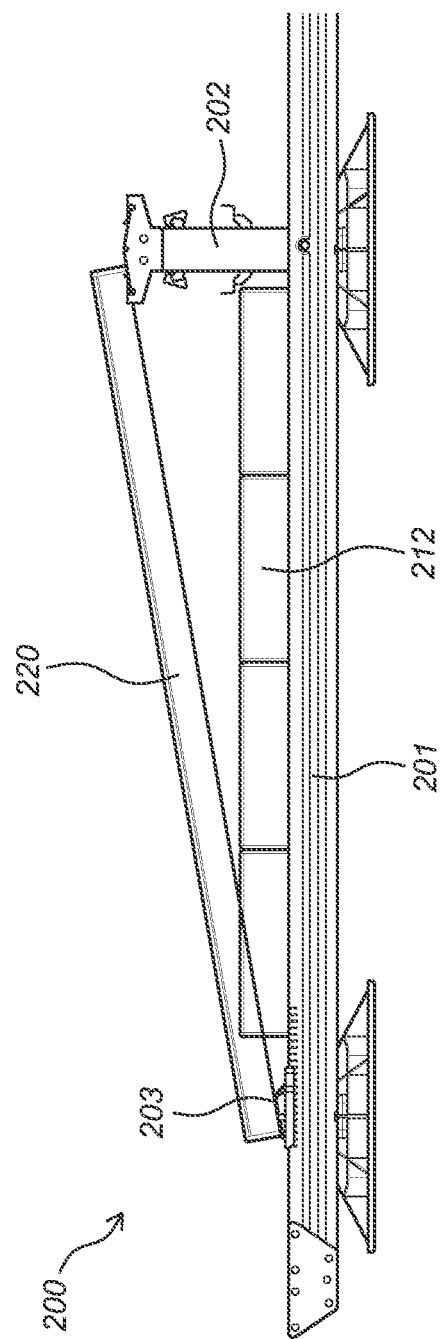

SYSTEM AND METHOD FOR MOUNTING A SOLAR PANEL ONTO A SUBSTANTIALLY FLAT MOUNTING SURFACE

CROSS-REFERENCE TO RELATED APPLICATIONS

This application is a continuation of U.S. patent application Ser. No. 16/793,352, filed on Feb. 18, 2020 and entitled "System and Method for Mounting a Solar Panel Onto a Substantially Flat Mounting Surface", which claims priority to European Patent Application No. 20157504.0 filed Feb. 14, 2020, the disclosures of which are hereby incorporated by reference in their entireties.

BACKGROUND OF THE INVENTION

Field of the Invention

The invention relates to a system for mounting at least one solar panel on a substantially flat mounting surface. The invention further relates to an assembly of such system and at least one solar panel. The invention also relates to a method system for mounting at least one solar panel on a substantially flat mounting surface.

Description of Related Art

Solar panels see application on both pitched mounting surfaces such as pitched roofs, and substantially flat mounting surfaces including flat roofs or (slightly) inclined roofs, as well as flat or slightly inclined (ground) surfaces. Legislation often prescribes a size limitation for solar panels installed on pitched roofs for the purpose of installation safety. However, such limitations commonly do not apply for the installation of solar panels on flat mounting surfaces. In the latter case, solar panels can thus be given relatively large dimensions, effectively increasing the surface area occupied by the solar cells and thus the energy generating capacity of the solar panels. Nowadays, it is even more focussed on relatively large surface areas to be covered by solar panel due to an increased interest in renewable energy sources. This requires a relatively large solar panel mounting structure or mounting system which is configured to be set up in a time- and labour efficient manner.

Hence, it is an object of the invention to provide an improved system and method for mounting at least one solar panel on a substantially flat mounting surface, or at least to provide an alternative to the known systems and methods.

SUMMARY OF THE INVENTION

The invention provides thereto a system for mounting at least one solar panel on a substantially flat mounting surface, comprising:
- at least one base element, preferably a substantially elongated base element, configured to be positioned upon a substantially flat mounting surface,
- at least one support structure configured for supporting at least part of at least one solar panel, wherein the support structure is connectable, or connected, to the base element, wherein the support structure comprises:
  - at least one retaining element for retaining at least part of a first edge of the solar panel,
  and
- at least one clamping element configured for (clampingly) engaging at least part of a second edge the solar panel, wherein the base element and the clamping element are mutually displaceable and
  wherein the clamping element and the base element comprise complementary fastening members configured for fixating at least one mutual position of the base element and the clamping element.

The system according to the present invention enables mounting of at least one solar panel in a relatively fast and simple manner. Due to the combination of the support structure comprising a retaining element for retaining at least part of a first edge of the solar panel and the smart cooperation between the clamping element and the base element it is enabled that a solar panel can be (clampingly) mounted or secured within the system whereby the use of mechanical fixing means, such as screws, can be omitted. Hence, the system can be referred to as a so-called toolless system, which can be set up without tools. The system therefore also enables providing of a relatively large system for mounting a number of solar panels in a limited amount of time. The base element, which is preferably substantially elongated, is configured for cooperation with both the support structure and the clamping element. At least one support structure and at least one clamping element are typically provided at a predetermined distance, or a predetermined distance range, from another. During mounting of the solar panel within the system, the distance between the clamping element and the support structure is typically increased. It is conceivable that the base element and the clamping element are displaceably, or movably, connected. It is for example conceivable that the base element and the clamping element are displaceable in a sliding manner. The base element may for example substantially act as a rail, wherein the clamping element can be configured for sliding over said rail. The clamping element may be connectable or connected to the base element. The first edge may for example be an upper edge of the solar panel and the second edge may for example be a lower edge of the solar panel, or vice versa.

Typically, in a situation wherein a solar panel is mounted by the system, the solar panel, support structure and base element define triangle, preferably a substantially right triangle. The support structure, and in particular the retaining element of the support structure, defines the extent of inclination of the solar panel(s) within the system.

Advantageously, the system comprises multiple base elements wherein each base element is connected to at least one support structure and at least one clamping element. It is also conceivable that a base elements is connected to multiple clamping elements and multiple support structures. The base element(s) can be positioned either directly or indirectly upon a substantially flat mounting surface.

Within the system according to the invention, preferably at least one clamping element is configured to engage an inner surface of the solar panel, in preferably the solar panel frame, more preferably an inner surface of a second part (or lower part or lower edge) of the solar panel frame (positioned below the PV cells) and/or wherein at least one retaining element is configured to engage an inner surface of the solar panel, preferably the solar panel frame, more preferably an inner surface of a first part (for example but not limited to an upper part or upper edge) of the solar panel frame (positioned below the PV cells). This allows the solar panels to be fastened blindly within the system, which is not only attractive from an aesthetical point of view, but allows solar panels to be positioned tightly adjacent to each other, which may lead to a considerable saving of space, which is advantageous from a practical and economical point of view. For example, solar panels can positioned next to another with a predetermined distance. Non-limiting examples of such predetermined distance are a range of 5 to 50 mm, preferably 7 to 30 mm, more preferably 8 to 12 mm. The blind fastening is also beneficial from an aerodynamic point of view because the use of protrusive elements can be omitted. In particular omitting the use of protrusive element on an upper side of the solar panel may be desired.

The base element and/or support structure may be made of a metal or a composite material that provides the necessary strength and rigidity that allow them to fulfil their support function. Preferably, a lightweight metal such as aluminium, or a lightweight composite such as a fibre-reinforced plastic is used to bring down the weight of the system as such, facilitating easier handling of the system components. Another non-limiting example of a material to be used is a (flat) carbon steel product coated with an alloy of zinc, aluminium and magnesium, in particular known as Magnelis. The base element(s) may be positioned loosely on the mounting surface, although it is also possible that the base element will be fixed to the mounting surface, for example by using an adhesive and/or mechanical fixing elements, such as screws.

When it is referred to a solar panel, this can be any conventional type of solar panel. When it is referred to a solar panel, also a solar module or PV module can be meant. Solar panels typically comprise an array of photovoltaic (PV) cells, commonly sandwiched between a top (glass) layer and a backing layer, which assembly of PV cells, top layer and backing layer are surrounded by a (solar panel) frame, constituting the edge of the solar panel. Any edge part of the solar panel mentioned in the present application is thus typically part of the solar panel frame. Non-limitative examples of solar panel related equipment, which may—instead of at least one solar panel or in addition to at least one solar panel—be mounted by the system according to the invention, are components like electrical inverters, DC/AC disconnects, meters, wiring, racking, further support structures for one or more components, charge controllers, batteries, additional system balances. Alternatively, the system according to the invention may also be used to support solar collectors (solar hot water panels) and/or components which may or may not be solar panel or solar collector related.

In a preferred embodiment, the complementary fastening members of the base element and the clamping element are configured for providing an interlocking connection. A benefit of such interlocking connection is that a relatively reliable and/or secure locking connection can be obtained between the base element and the clamping element. Such interlocking connection can prevent undesired unlocking or decoupling between the base element and the locking element.

In an advantageous embodiment, the base element comprises a plurality of adjacent grooves and the clamping element comprises at least one tooth configured to be received within at least one groove. In this manner, an interlocking connection between the base element and the clamping element can be provided in a relatively simple manner. Further, the presence of a plurality of adjacent grooves, or a series of grooves, enables that mutual fixating between the base element and the clamping element can be provided for multiple (mutual) positions. The grooves of the plurality of grooves are preferably positioned at a predetermined mutual distance from another.

When it is referred to a 'groove' also a hole, a through hole, a cavity and/or recess could be meant. In a further preferred embodiment, the clamping element comprises multiple teeth. Such teeth are preferably provided at a mutual predetermined distance. For such embodiment, typically, the base element comprises more grooves than the clamping element comprises teeth, providing multiple positioning possibilities for the fixation of the mutual position between the base element and the clamping element.

It is further conceivable that the clamping element at least partially encloses the base element. It is also conceivable that the clamping element encloses at least part of the base element. Preferably the clamping element encloses at least part of un upper side of the base element, in particular such that the clamping element can slide over the base element. In case the clamping element is configured to substantially slide over the base element, this is preferably at least in an outward direction. The outward direction should be considering from the point of view from a (mounted) solar panel. It can also be said in a direction facing away from the support structure. In this way, the clamping element can be displaced such that it can be directed towards an inner side of the solar panel, thereby providing the desired (clamping) engagement. It is conceivable that the base element and clamping element are provided with multiple complementary fastening members, possibly opposing another. Possibly the clamping element substantially clampingly engages the base element. It is beneficial if the mutual displacement between the clamping element and the base element is restricted in substantially one dimension, preferably the longitudinal direction of the base element. Such embodiment could be achieved via different variants of the clamping element and/or base element.

It is also possible that the clamping element is configured for double sided engagement of the base element. It is possible that the clamping element is configured for double, or multiple, sided engagement of the base element as such, but it is also conceivable that the clamping element is configured for double sided engagement of at least two side walls of the base element. All of the described embodiment can provide a more reliable co-action between the clamping element and the base element.

In a preferred embodiment, the clamping element comprises at least one second retaining surface configured to engage at least part of the second edge of the solar panel. The presence of a lower retaining surface may contribute to providing a more stable engagement between the clamping element and the solar panel. The lower retaining surface is preferably configured to engage an inner side of the solar panel and/or an inner side of a frame part of the solar panel. Preferably, during use, the solar panel is in direct contact with the lower retaining surface of the clamping element if the clamping element and the base element are mutually fixed such that the clamping element substantially provides a continuous clamping force onto the solar panel in an outward direction.

Possibly, the clamping element comprises at least one resilient (second) lip configured for engaging of at least part of the solar panel in a resilient manner. Such resilient lip may, for example, be configured to clampingly engage at least part of a frame part of the solar panel. The resilient lip is preferably configured for providing a clamping force in substantially downward direction. This may further stabilize the position of the solar panel with respect to at least the clamping element. The (second) resilient lip may also contribute to controlled mounting of the solar panel with respect to the clamping element as such. The resilient lip may in fact also act as a secondary locking member. If both applied, it is conceivable that a second receiving space for receiving at least part of the solar panel is at least partially defined by the second retaining surface and the second resilient lip of clamping element.

Preferably, the clamping element comprises an inclined upper surface configured for engaging at least part of the solar panel. The inclined upper surface may provide support for the solar panel once the solar panel is mounted within the system. Part of the solar panel may directly engage upon the inclined upper surface. Preferably the angle of inclination is in line with the inclination of the mounted solar panel. The inclined upper surface may also act as a guiding surface configured for enabling easier installation of the solar panel within the system.

The clamping element may further comprise at least one gripping element configured for manual gripping. The presence of at least one gripping element may further contribute to the ease of use of the clamping element, and thus for the system as such. Typically, gripping of the gripping element is a toolless act. The gripping element is preferably configured to be manually gripped by a user. The gripping element may for example comprise a recess configured to be gripped by at least one finger of a user. The gripper element is preferably provided on a distal end of the clamping element, preferably on the frontal side, i.e. a part substantially facing away from the solar panel.

At least one clamping element may be provided with an adjustable retention element for fixating (securing) the clamping element relative to the base element in at least one or multiple preferred positions, more preferably in a number of different positions mutually shifted in the direction of elongation of the base element. The adjustable retention element may further contribute to easier mounting of the solar panel. In a possible embodiment, the retention element may comprise a toothed edge and/or a toothed profile, such as a saw tooth profile, configured for engaging a part of the base element. More preferably, the retention element may be formed by a strip which is provided with a profiled lower surface. This profiled lower surface may e.g. be formed by a saw tooth profile. One end of the strip is connected to the clamping element, while an opposite end of the strip constitutes a free end portion, which is typically (also) configured to be engaged by a user, during installation and uninstallation. By sliding the toothed edge of the retention element along the base element in the direction of elongation of the base element, one of the teeth locks behind the base element, retaining the retention element and therewith the clamping element in a certain position relative to the base element. The specific position of the clamping element relative to the base element is hereby dependent on the specific tooth through with the engagement of the retention element on the base element is realised.

The retention element may be resiliently connected to the clamping element for being resiliently pressed against a part of the base element. This ensures that the retention elements is urged towards a position wherein the retention element (clampingly) engages the base element and the clamping element remains fixed with relation to the base element. In order to disengage the retention element from the base element and therewith enabling repositioning of the clamping element to the base element and/or removal of the clamping element from the base element, a force must be exerted onto the retention element to displace the retention element under further deformation of the resilient connection between the retention element and the clamping element. The retention element is preferably resiliently pressed against a part of the base element in a direction away from the clamping element. This causes the clamping element to be urged away from the retention element when the retention element engages the base element. The clamping element may hereby be forced against a part of the base element opposing the part of the base element engaged by the retention element. Disengagement of the retention element from the frame hereby involves a convenient pinching action, wherein the retention element is moved towards the clamping element. This pinching action may be facilitate by providing the resilient retention element (retention strip) more length to increase the physical moment of force exerted by a user onto (an end portion of) the retention element (retention strip). To this end, the length of the retention element is preferably at least 3 centimetre, more preferably at least 5 centimetre. The retention element may however also be resiliently pressed against a part of the base element in a direction towards the clamping element.

Preferably, the clamping element is made of plastic, and/or a lightweight composite such as a fibre-reinforced plastic, and/or a metal, preferably a lightweight metal such as aluminium. In case a resilient lip and/or a retention element is applied, the resilient lip and/or the retention element is preferably made in one piece with the clamping element. In a further preferred embodiment, the clamping element is substantially made of steel. The clamping element being made of steel can benefit of a good durability as well as a good resistance to environmental influences, resulting in a relatively long lifetime.

It is imaginable that at least one clamping element is configured for simultaneously clamping, and hence securing (locking), a plurality of solar panels and/or at least one solar panel and at least one other component to the base element. An embodiment of the system is also possible wherein the clamping element comprises a plurality of profiled contact areas configured for providing a restraining effect and/or for providing bonding, in particular electrical bonding, between the clamping element and further components. It is also conceivable that any of the base element, support structure, retaining element and/or the reinforcing structure comprises at least one profiled contact area. Such profiled contact area can for example be formed by a plurality of (small) teeth which are configured to scratch into an adjacent component.

It is conceivable that the retaining element comprises at least one retaining surface configured to engage at least part of the edge of the solar panel. Such retaining surface could in particular be configured to engage at least part of the first edge, for example an upper edge, of the solar panel. More in particular, the retaining surface could be configured to engage at least part of the frame of the solar panel. It may be beneficial if a plane defined by the engaging surface is inclined with respect to the longitudinal direction of the support structure. It can also be said that a plane defined by the engaging surface encloses an angle with respect to the longitudinal (thus substantially vertical) direction of the support structure. The plane defined by the engaging surface is more preferably inclined with respect to the longitudinal direction of the support structure in an upward direction. Such inclined orientation of the retaining surface facilitates retaining of the solar panel in a relatively simple manner. It may also positively contribute to the positioning of the solar panel within the system under a predetermined angle. Hence, the retaining surface may be configured to direct the solar panel in a predetermined position. If applied, the retaining surface may be substantially parallel to the second retaining surface of the clamping element.

Possibly, the retaining element comprises a receiving space configured for receiving at least part of an edge of the solar panel. The receiving space may be configured to enclose at least part of the edge of the solar panel. An embodiment wherein the retaining element comprises a receiving space may provide a more controlled retaining of the solar panel within the mounting system. This may further contribute to the ability to not apply any mechanical fastening means, such as screws, during mounting of the solar panel onto the substantially flat mounting surface. In another preferred embodiment, the retaining element comprises at least one resilient lip configured for (clampingly) engaging of at least part of the solar panel in a resilient manner. Such resilient lip may, for example, be configured to clampingly engage at least part of a frame part of the solar panel. The resilient lip is preferably configured for providing a clamping force in a substantially downward direction and/or a direction towards the support structure. This may further stabilize the position of the solar panel with respect to at least the support structure. The resilient lip may also contribute to controlled mounting of the solar panel with respect to the retaining element as such. The resilient lip may in fact also act as a locking member. If both applied, it is possible that the resilient lip is at least partially received within the receiving space. It is also conceivable that the receiving space is at least partially defined by the retaining surface and the resilient lip, if applied. Possibly, with respect to the abovementioned embodiments, part of the solar panel can be substantially hooked behind part of the retaining element.

It is also possible that the support structure and/or the retaining element comprises a support surface configured for engaging and thus direct support of at least part of the solar panel.

In a preferred embodiment of the system, the retaining element is provided at an upper section of the support structure. Hence, a more space efficient system can be obtained. It may further be prevented that system parts and/or system elements extend with respect to the solar panels being mounted within the system. This is beneficial from aesthetic point of view, but also for safety reasons. Further, it is possible that the retaining element is connectable to the support structure and/or that the retaining element is connected to the support structure. In such embodiment, the retaining element could be a separate component configured for co-action with the support structure. By making use of a retaining element it is enabled that different types of retaining element can be used, which could for example be further adapted to the type of solar panel to be mounted. However, it is also possible that the retaining element forms integral part of the support structure. This embodiment may be more rigid and/or may prevent that undesired disconnection between the support structure and the retaining element occurs.

In a further preferred embodiment of the mounting system according to the present invention, the support structure comprises at least two the retaining elements positioned at a distance from another, wherein each retaining element is configured for retaining at least part of an edge of a solar panel. Typically, the retaining elements are positioned at opposing sides of the support structure. Hence, a first and a second solar panel mounted to respectively a first and a second retaining element, extend in a direction facing away from another. Each of the retaining element could be designed as one of the above mentioned non-limiting examples. It is also conceivable that the at least two retaining elements are substantially identical. This may result in the support structure being substantially symmetrical over a cross section in longitudinal direction. As a result thereof, the support structure may provide a balanced situation for the solar panels during use.

It is conceivable that at least one support structure is pivotably connected to at least one base element, such that the support structure and base element are mutually displaceable between at least a collapsed (or folded) position and an upright position. The upright position can also be referred to as the position of use, wherein the support structure extend in a substantially perpendicular direction with respect to the base element. In the collapsed position, the base element and the support structure are in a relatively compact configuration. This may for example, enable easier transport and handling. It is beneficial to use a pivotable connection, as the mutual displacing between the base element and the support structure can be initiated in a relatively simple manner. It is for example possible that the base element and the support structure are mutually connected via at least one pivot connection, such as via a pivot pin. The system, and in particular the base element and/or the support structure, may comprise at least one locking element for locking the support structure and base element at least in the upright position. This may further contribute to providing a reliable system, wherein it can be ensured that the base element and support structure are in a preferred orientation.

Possibly, at least part of the base element defines at least one accommodating space for accommodating at least part of the support structure and/or at least part of the clamping element. This is for example advantageous for storage and/or transport purposes. The base element may also fulfil a protective function for the support element and/or the clamping element. It is for example conceivable that a cross section of the base element is substantially U-shaped. This provides a relatively rigid element, wherein the side walls of the U-shaped base element may additionally provide a reinforcing function. It is also conceivable that the base element has a substantially U-shaped cross section, wherein the upper edges of the side walls are folded, preferably in an inward manner. The presence of folded edges may further provide more strength to the base element. The folded edges may also be configured for co-action with part of the clamping element. It is conceivable that at least one folded edge defines a(n) (secondary) accommodating space for accommodating at least part of the clamping element. This may for example reduce the degrees of freedom for mutual displacement between the clamping element and the base element. Folding of the side walls in a substantially inward manner is preferred with respect to folding in an outward manner, since herewith a more protected configuration can be obtained.

It is also possible that at least one base element encloses at least part of at least one support structure. The support structure could for example be at least partially be received in part of the base element. If the base element encloses at least part of the support structure, a more solid configuration of the system can be obtained. The base element may also fulfil a protective function for the support structure.

The system comprises in a preferred embodiment at least one reinforcing structure which is connected, or connectable, to at least one support structure, and preferably to a plurality support structures if applied. The support structure (s) may thereto possibly comprise at least one support finger, and preferably multiple support fingers, configured for co-action with at least one reinforcing structure. Possibly, the reinforcing structure is substantially profiled, such that cooperation with at least one support finger of the support structure can be more effectively facilitated. Also, such connection between at least one reinforcing structure and at least one support structure can be initiated in a toolless manner. The reinforcing structure is preferably substantially elongated in a direction substantially perpendicular the longitudinal direction of the support structure. In this way, the reinforcing structure and support structure can achieve that a relatively rigid three-dimensional support network can be obtained.

The system may further comprise at least one side panel connected or connectable to at least the solar panel and/or the support structure and/or the base element. The side panel can for example be a side wall. A side panel may provide a protective function for the system. The side panel may for example provide a substantially air tight barrier, thereby preventing that wind, or the like, can blow underneath the solar panels. It is conceivable that at least one side panel is positioned under an angle. This may further contribute to the protective and/or support function of such side panel. When it is referred to a side panel, also a front panel and/or a back panel can be meant. The use of at least one side panel may also result in that the use of, optional, ballast elements can be reduced or even omitted.

In a further beneficial embodiment of the system according to the present invention, at least one base element is extendable in at least the longitudinal direction. This may enable more efficient storage and/or transport of the base element(s). It is for example conceivable that the base element is telescopically extendable. It is also possible that at least one base element comprises at least two base element parts which are mutually connected via at least one hinge, such that base element is (hingeably) displaceable between at least an extended position and a folded (or collapsed) position. In the extended position, at least two base element parts are substantially in line with another where in the folded position at least two base element parts are substantially parallel to another. It can also be said that in the extended position at least two base element parts extend in longitudinal direction, and/or that in the folded position at least two base element parts are positioned substantially parallel. The use of at least one hinge between at least two base element part is advantageous as this enables unfolding (and folding) via a relatively simple (hinging) mechanism. It is also an act which can be performed without the requirement of using tools which is beneficial for the overall mounting time needed to install the system. Each base element part may be substantially elongates. It is conceivable that each base element part is connected with at least one support structure configured for supporting at least part of at least one solar panel, wherein the support structure comprises at least one retaining element for retaining at least part of a first edge, for example an upper edge, of the solar panel, and wherein each base element part is connected with at least one clamping element configured for clampingly engaging at least part of a second edge the solar panel, wherein the base element part and the clamping element are mutually displaceable and wherein the clamping element and the base element part comprise complementary fastening members configured for fixating at least one mutual position of the base element part and the clamping element. The base element may also comprise a plurality of base element parts which are mutually connected via at least one hinge. It is further conceivable that at least one outer end of a base element is provided with a coupling part configured for coupling the base element to an adjacent base element. This may enable enlarging of the system in a relatively easy manner.

The system may further comprises at least one foot configured for supporting at least the base element on the mounting surface. In a typical instance, the system comprises multiple feet mutually spaced apart to provide the base element with a stable support base. The at least one foot may form part of the elongated base element. The at least one foot may however also be formed by a separate component being connected to the frame and possibly being configured for attachment to the mounting surface. The foot may be provided with attachment means such as mounting holes for the pass-through of fasteners connecting the foot and therewith the base element to the mounting surface. One of the benefits of utilizing one or more separate feet is that the base element, which is commonly made from a thermally conductive metal such as steel or aluminium, can be thermally decoupled from the mounting surface. A foot is for this purpose commonly manufactured from a thermally insulating material such as a plastic, and more in particular a (ethylene propylene diene monomer) rubber. Another benefit of using a separate foot is that at least one of the feet may be moveable relative to the frame. This allows the base element to move relative to the mounting surface to compensate for thermal expansion of the solar panel and/or the frame thereof. The feet may particularly be moveable relative to the base element in at least a direction perpendicular to and/or in line with the direction of elongation of the base element to permit movement of the base element relative to the mounting surface in a lengthwise direction of the solar panel. Such foot van also be referred to as support member.

To prevent the system and the therewith connected solar panel(s) to be lifted off the mounting surface, for example under the influence of wind forces, the system, and in particular the base element, may be provided with at least one ballast element to weight down the system. The at least one ballast element may hereto be provided on a part of the base element close to the mounting surface to lower the centre of gravity of the assembly of the system and at least one solar panel. Heavy objects such as bricks or gravel are highly suitable for use as ballast elements. In case the base element comprises a receiving space, it is preferred that at least one ballast element is adapted to be at least partially received in said receiving space. It is also conceivable that the ballast substantially encloses at least part of the base element.

The invention also relates to a system as described for the present invention wherein at least one retaining element is configured for retaining at least part of a lower edge of the solar panel and wherein at least one clamping element is configured for clampingly engaging at least part of an upper edge the solar panel. In addition to this, the invention also relates to a system for mounting at least one solar panel on a substantially flat mounting surface, comprising at least one base element, preferably a substantially elongated base element, configured to be positioned upon a substantially flat mounting surface, wherein the base element comprises, or is connected to, at least one retaining element for retaining at least part of a lower edge of the solar panel, at least one support structure configured for supporting at least part of at least one solar panel, wherein the support structure is connected to at least one clamping element configured for clampingly engaging at least part of an upper edge the solar panel, wherein the support structure and the clamping element are mutually displaceable and wherein the clamping element and the support structure comprise complementary fastening members configured for fixating at least one mutual position of the support structure and the clamping element. For this embodiment, the base element, retaining element, support structure and/or clamping element may all be designed according to any of the non-limiting examples described for the present invention. The spatial orientation and/or positioning of said components can be adapted, for example inverted, in order to provide the desired engagement with a solar panel.

The invention also relates to an assembly of a system according to present invention and at least one solar panel. The invention further relates to a clamping element, base element and/or support structure according to the present invention, in particular configured for use in a system according to the present invention.

The invention further relates to a method for mounting at least one solar panel on a substantially flat mounting surface via using a system according to any of the previous claims, the method comprising the steps of providing a system for mounting at least one solar panel on a substantially flat mounting surface according to the present invention, positioning at least one solar panel onto at least one support structure, such that at least part of a first edge of the solar panel is retained by at least one retaining element, engaging at least part of a second edge of the solar panel by displacing at least one clamping element with respect to the base element, and fixating the mutual position of the base element and the clamping element such that the solar panel is clampingly secured within the system.

The method benefits of the same advantages as outlined for the system according to the present invention, in particular that toolless mounting of solar panel(s) can be done in a relatively simple and fast manner. It is conceivable that the step of engaging at least part of a second edge of the solar by displacing at least one clamping element with respect to the base element is done performed by sliding the clamping element over the base element in an direction facing away from the solar panel. Typically, during this step, the distance between the clamping surface and the retaining element is increased.

The invention will be further elucidated on the basis of the following non-limitative clauses.

1. System for mounting at least one solar panel on a substantially flat mounting surface, comprising:
    at least one base element, preferably a substantially elongated base element, configured to be positioned upon a substantially flat mounting surface,
    at least one support structure configured for supporting at least part of at least one solar panel, wherein the support structure is connected to the base element, wherein the support structure comprises:
        at least one retaining element for retaining at least part of a first edge of the solar panel,
        and
        at least one clamping element configured for clampingly engaging at least part of a second edge the solar panel,
    wherein the base element and the clamping element are mutually displaceable and
    wherein the clamping element and the base element comprise complementary fastening members configured for fixating at least one mutual position of the base element and the clamping element.
2. System according to clause 1, wherein the complementary fastening members of the base element and the clamping element are configured for providing an interlocking connection.
3. System according to any of the previous clauses, wherein base element comprises a plurality of adjacent grooves and wherein the clamping element comprises at least one tooth configured to be received within at least one groove.
4. System according to any of the previous clauses, wherein the clamping element at least partially encloses the base element.
5. System according to any of the previous clauses, wherein the clamping element comprises an inclined upper surface configured for engaging at least part of the solar panel.
6. System according to any of the previous clauses, wherein the clamping element comprises at least one second retaining surface configured to engage at least part of the second edge of the solar panel.
7. System according to any of the previous clauses, wherein the clamping element comprises at least one resilient lip configured for engaging of at least part of the solar panel in a resilient manner.
8. System according to any of the previous clauses, wherein the clamping element comprises at least one gripping element configured for manual gripping.
9. System according to any of the previous clauses, wherein the retaining element comprises at least one retaining surface configured to engage at least part of an edge of the solar panel.
10. System according to any of the previous clauses, wherein the retaining element comprises a receiving space configured for receiving at least part of an edge of the solar panel.
11. System according to any of the previous clauses, wherein the retaining element comprises at least one resilient lip configured for engaging of at least part of the solar panel in a resilient manner.
12. System according to any of the previous clauses, wherein the retaining element is provided at an upper section of the support structure.
13. System according to any of the previous clauses, wherein the retaining element forms integral part of the support structure.
14. System according to any of the previous clauses, wherein the support structure comprises at least two the retaining elements positioned at a distance from another, wherein each retaining element is configured for retaining at least part of an edge of a solar panel.
15. System according to any of the previous clauses, wherein at least one support structure is pivotably connected to at least one base element, such that the support structure and base element are mutually displaceable between at least a collapsed position and an upright position.
16. System according to clause 15, comprising at least one locking element for locking the support structure and base element at least in the upright position.
17. System according to any of the previous clauses, wherein at least part of the base element defines an accommodating space for accommodating at least part of the support structure and/or at least part of the clamping element.
18. System according to any of the previous clauses, comprising at least one reinforcing structure which is connected to at least one support structure.
19. System according to clause 18, wherein the reinforcing structure is substantially elongated in a direction substantially perpendicular the longitudinal direction of the support structure.
20. System according to any of the previous clauses, wherein at least one base element is extendable in at least longitudinal direction.
21. System according to any of the previous clauses, wherein at least one base element comprises at least two base element parts which are mutually connected via at least one hinge, such that base element is displaceable between an extended position and a folded position.

22. System according to any of the preceding clauses, comprising at least one foot configured for supporting at least the base element on the mounting surface.

23. System according to any of the previous clauses, comprising at least one ballast element.

24. Assembly of a system according to any of the previous clauses and at least one solar panel.

25. Method for mounting at least one solar panel on a substantially flat mounting surface via using a system according to any of the previous clauses, the method comprising the steps of:
   a) providing a system for mounting at least one solar panel on a substantially flat mounting surface according to any of clauses 1-23,
   b) positioning at least one solar panel onto at least one support structure, such that at least part of a first edge of the solar panel is retained by at least one retaining element,
   c) engaging at least part of a second edge of the solar by displacing at least one clamping element with respect to the base element, and
   d) fixating the mutual position of the base element and the clamping element such that the solar panel is clampingly secured within the system.

BRIEF DESCRIPTION OF THE DRAWINGS

The invention will be further elucidated below on the basis of the non-limitative exemplary embodiments shown in the following figures. Herein shows:

FIGS. 3a-3e a detailed part of the system as shown in FIGS. 2a-2h wherein part of the mounting of the solar panel is described;

FIGS. 4a-4c a detailed part of the system as shown in FIGS. 2a-2h wherein part of the mounting of the solar panel is described.

Within these figures, similar reference signs correspond to similar or equivalent technical features, components and/or elements.

DESCRIPTION OF THE INVENTION

Figure 1:
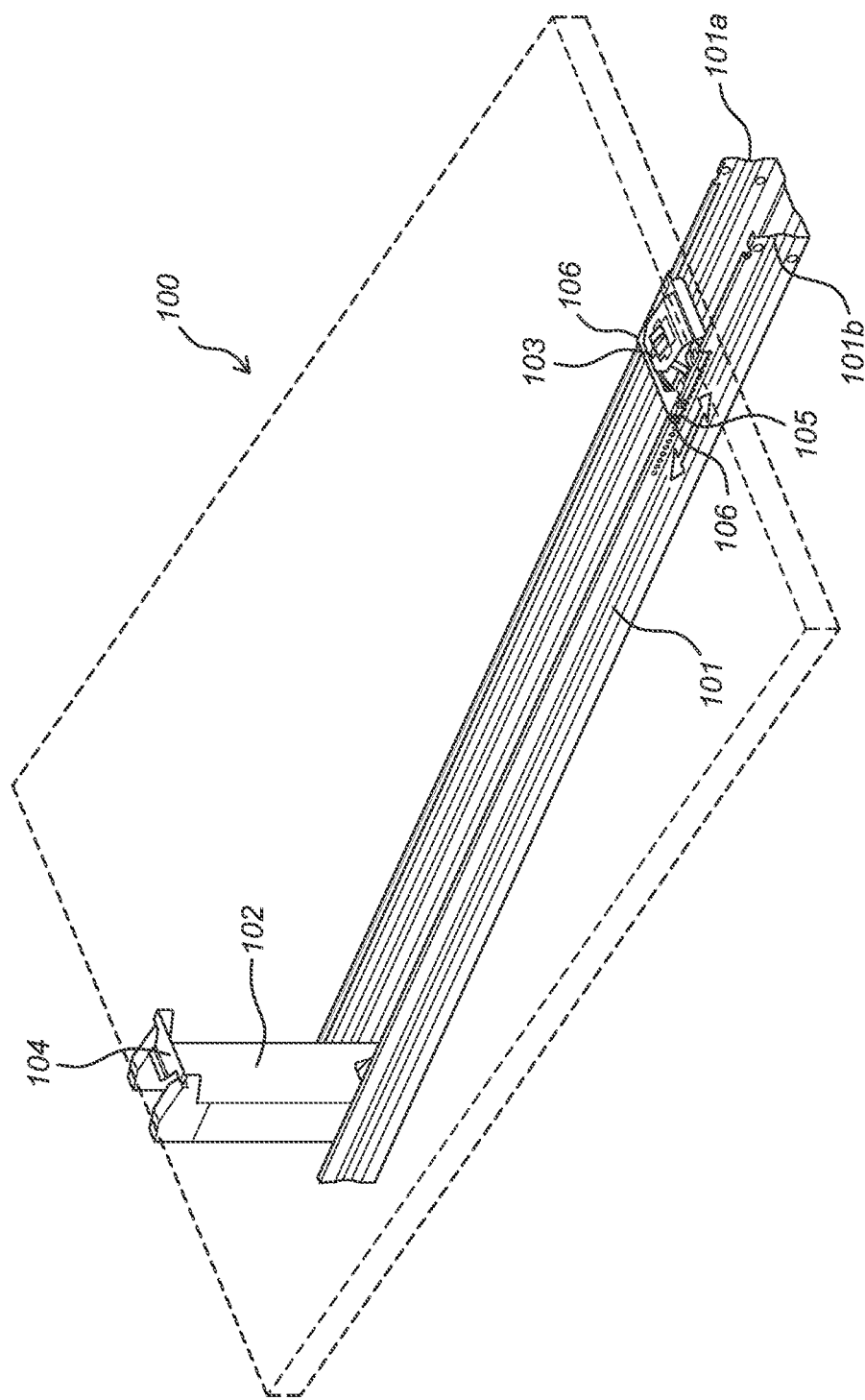
FIG. 1 a first possible embodiment of a system according to the present invention.

FIG. 1 shows a schematic representation of a first possible embodiment of a system 100 according to the present invention. The figure shows a perspective view of the system 100 wherein the solar panel is not shown, but its intended position is indicated with dotted lines. The system 100 is configured for mounting a solar panel on a substantially flat mounting surface. The system 100 comprises a base element 101, a support structure 102 and a clamping element 103. The support structure 102 comprises a retaining element 104 for retaining at least part of first edge, in particular an upper edge of the solar panel. The base element 101 is substantially elongated and positioned directly upon the substantially flat mounting surface. In the shown embodiment, the base element 101 is substantially U-shaped. The base element 101 therefore comprises two substantially parallel side walls 101a, 101b. Partially because of the U-shape and/or the substantially structured side walls 101a, 101b the base element 101 is substantially rigid. The support structure 102 is configured for supporting at least part of the solar panel and the support structure 102 is connected to the base element 101. In the shown embodiment, a lower part of the support structure 102 is enclosed by the base element 101. The retaining element 104 is provided at an upper section of the support structure 102. The clamping element 103 is configured for clampingly engaging at least part of a second edge, in the shown embodiment a lower edge of the solar panel. The clamping element 103 and the support structure 102 are positioned at a predetermined distance with respect to another, preferably based upon the length of solar panel to be mounted, as the solar panel substantially defines the inclined side, or possibly hypotenuse, between the support structure 102 and clamping element 103 (and base element 101). The base element 101 and the clamping element 103 are mutually displaceable, the direction of possible displacing is indicated with an arrow. Further, the clamping element 103 and the base element 101 comprise complementary fastening members 105, 106 configured for fixating at least one mutual position of the base element 101 and the clamping element 103. It can be seen that in a position wherein the solar panel is mounted, the clamping element 103 is positioned substantially underneath the solar panel.

FIGS. 2a-2h show another possible embodiment of a system 200 according to the present invention and a sequence of steps on how a possible embodiment of the system 200 according to the present invention can be mounted upon a substantially flat mounting surface.

Figure 2A:
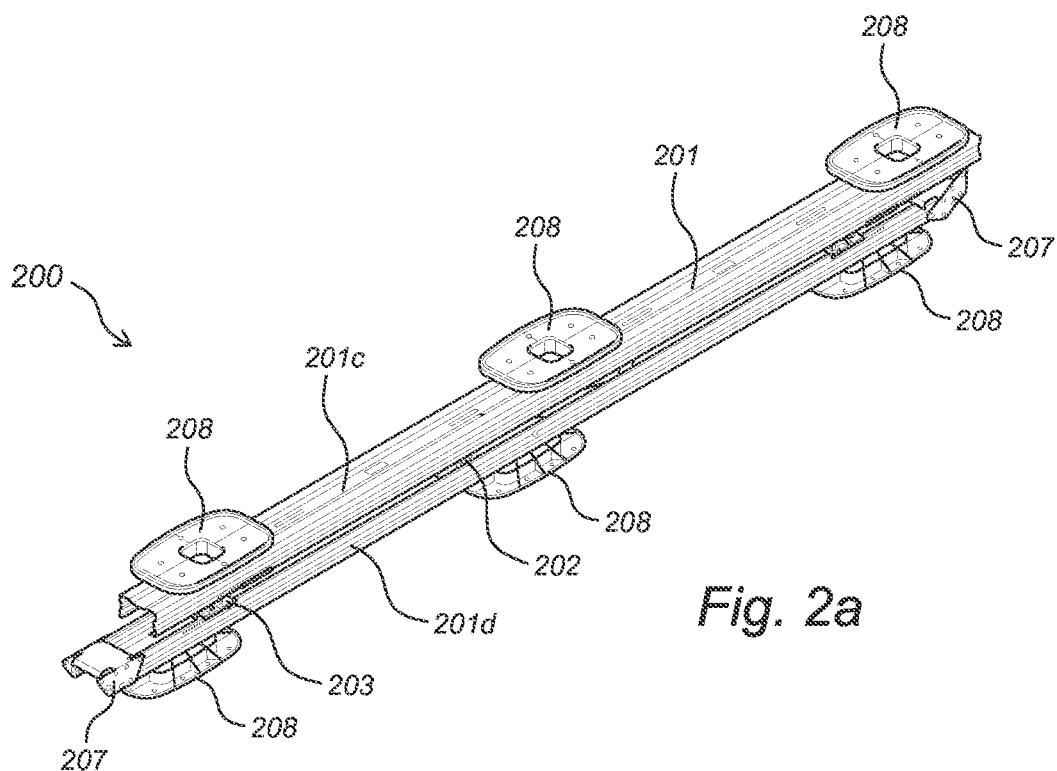
FIGS. 2a-2h a sequence of steps on how a possible embodiment of the system according to the present invention can be mounted upon a substantially flat mounting surface.

FIG. 2a shows a substantially elongated base element 201. It can be seen that the base element 201 comprises two base element parts 201c, 201d which are mutually connected via a hinge 207. In FIG. 2a, the base element 201 is in a folded position, the base element parts 201c, 201d being positioned substantially parallel to another. The base element 201 is connected to a plurality of feet 208. Each foot 208 is configured for supporting at least the base element 201 upon the mounting surface. The system 200 as shown comprises multiple support structures 202 and multiple clamping elements 203.

Figure 2B:
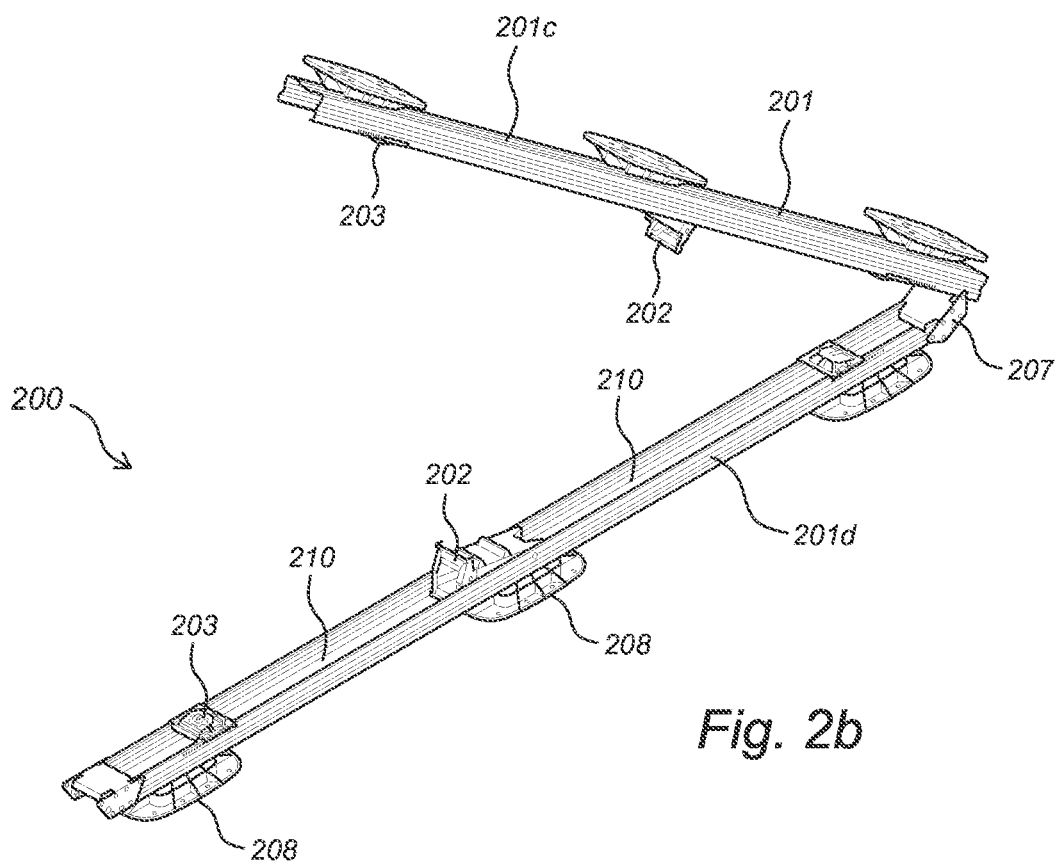
Figure 2C:
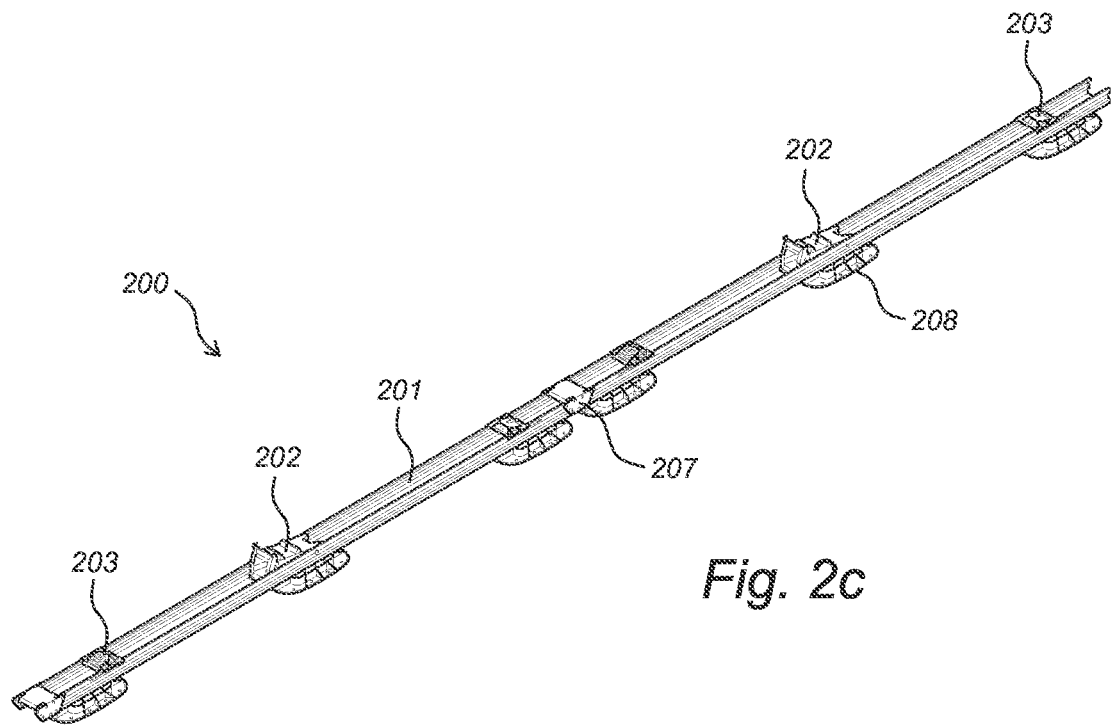

FIG. 2b shows that the base element 201 is partially pivoted via the hinge 207. Hence, the base element 201 is in an intermediate position between the folded position and the extended position. This is a step which can be done manually by a user of the system 200. The figure further shows that the base element 201 defines an accommodating space 210 for accommodating at least part of the support structures 202 and/or at least part of the clamping elements 203. FIG. 2c shows the base element 201 in the extended position. The difference between FIG. 2a and FIG. 2c shows that the base element 201 is extendable in the longitudinal direction. This figure shows clearly that the support structures 202 are in the collapsed position. The support structures 202 are merely in a lying position resulting in a rather compact spatial configuration.

Figure 2D:
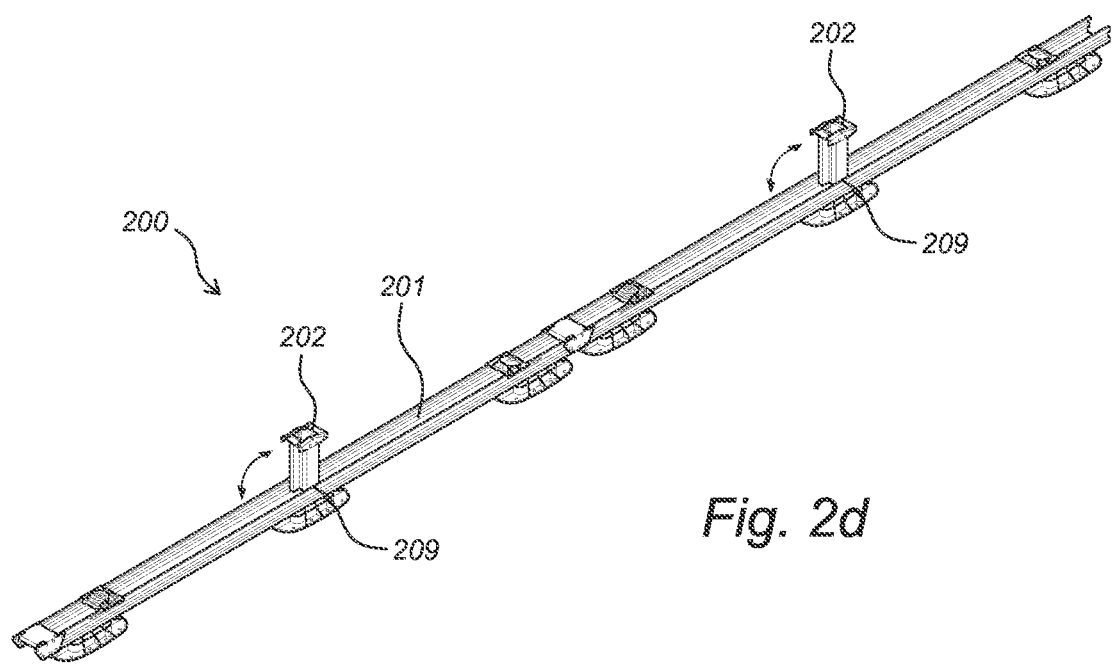

A subsequent step for the mounting process is shown in FIG. 2d, wherein the support structures 202 are put into an upright position. The arrows indication the direction of displacement. The is in the shown embodiment enabled due to the support structures 202 being pivotably connected to the base element 201. Preferably, the system comprises locking elements 209 for locking the support structure 202 and base element 201 at least in the upright position. Such locking element 209 may for example be a locking pin 209.

Figure 2E:
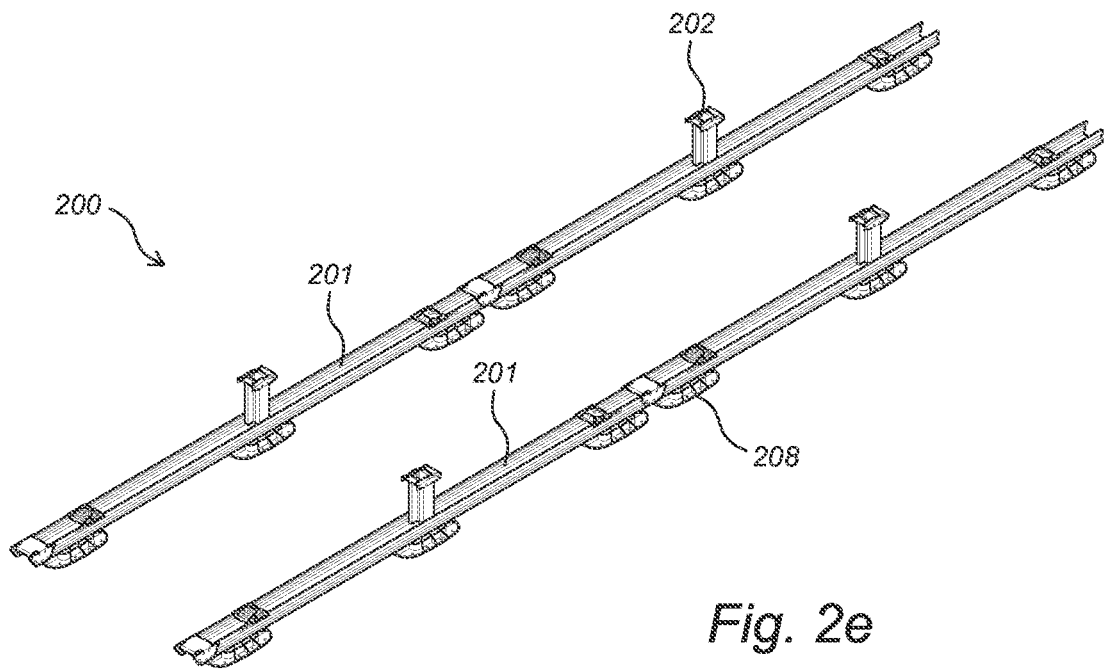
Figure 2F:
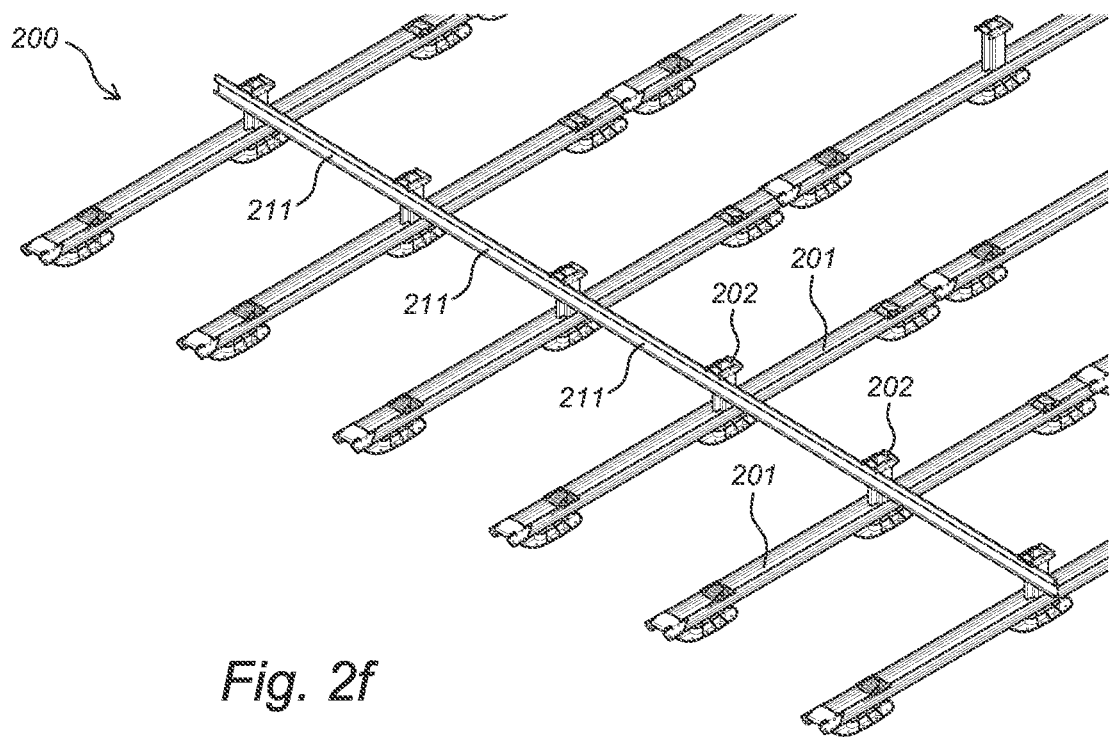

FIGS. 2e and 2f show that multiple base elements 201, as shown in the previous figures, are provided. This enables the provision of a relatively large system 200 for mounting a plurality of solar panels. FIG. 2f further shows that reinforcing structures 211 are connected to the support structures 202. In the shown embodiment, the support elements 202 are substantially enclosed by two substantially parallel reinforcing structures 211. The reinforcing structures 211 are substantially elongated in a direction substantially perpendicular the longitudinal direction of the support structures 202.

Figure 2G:
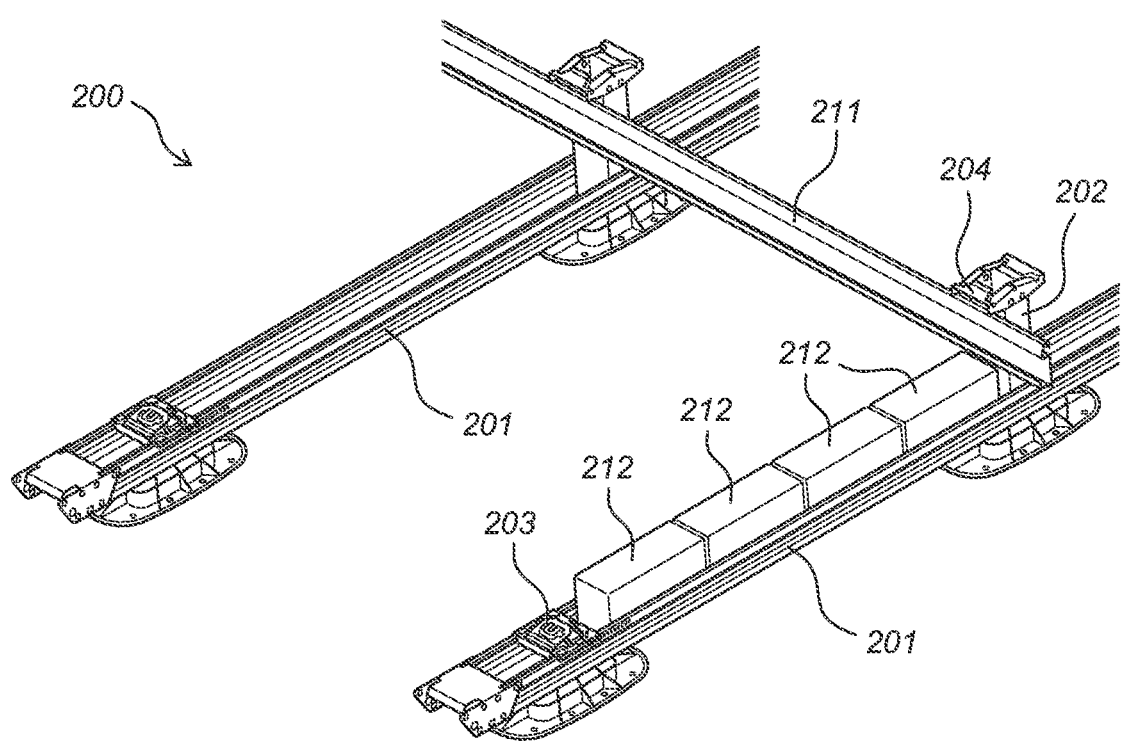

FIG. 2g shows a more detailed part of the system 200 as shown in the previous figures, wherein the system 200 further comprises a plurality of ballast elements 212. The ballast elements 212 are positioned within the receiving space 210 of the base element 201. The figure also shows that the support structure 202 comprises a retaining element 204 for retaining at least part of an upper edge of a solar panel. It can further be seen that the clamping element 203 is positioned such that it can engage at least part of a second edge the solar panel. The mutual displaceable character between the clamping element 203 and the base element 201 will be shown in FIGS. 4a-4c.

Figure 2H:
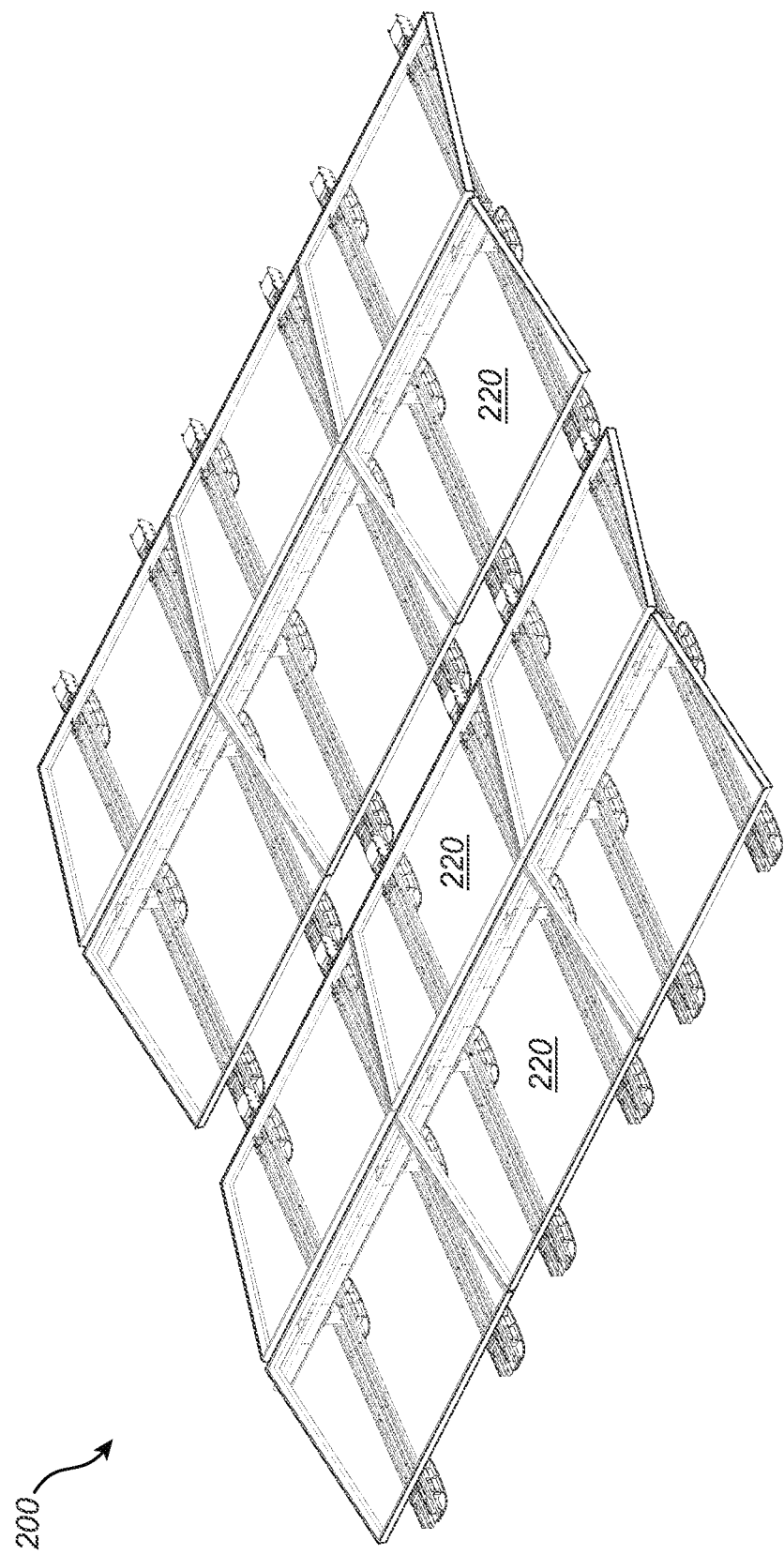
Figure 3B:
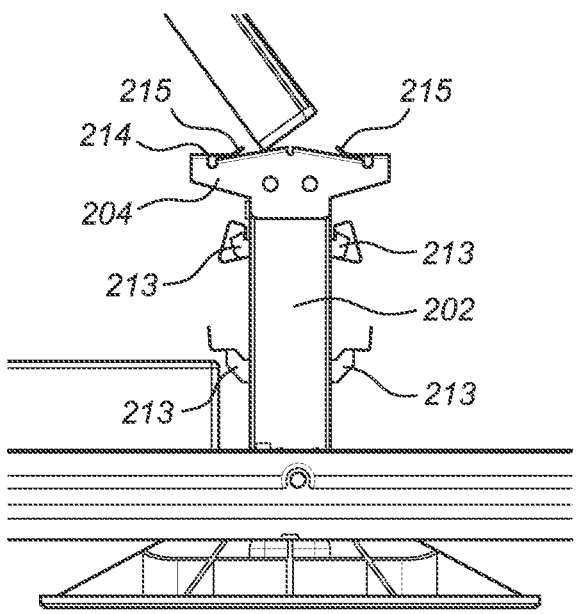
Figure 3C:
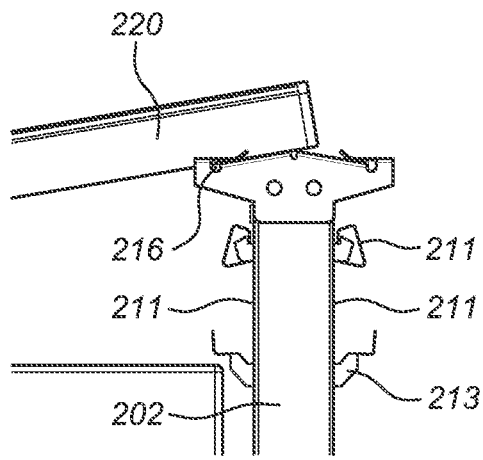
Figure 3D:
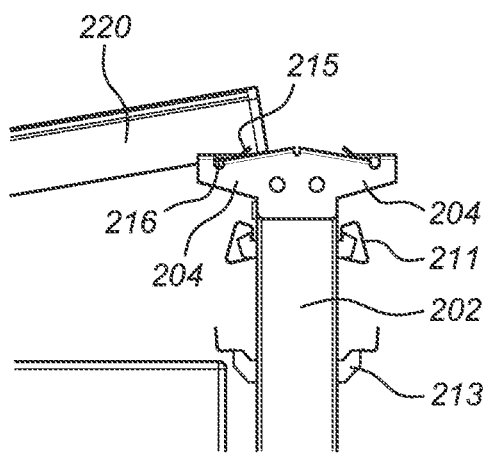
Figure 3E:
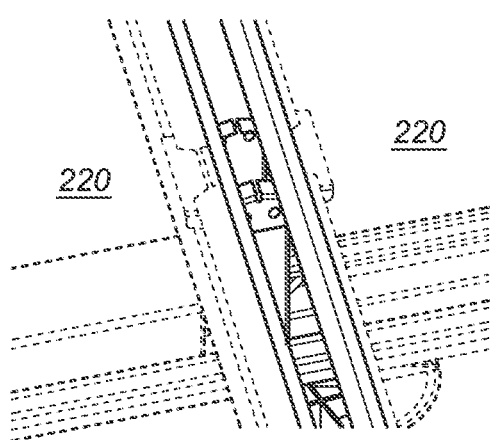

FIG. 2h shows the system 200 wherein a plurality of solar panels 220 is mounted within the system 200. Each solar panel 200 is (clampingly) mounted whereby the solar panel 220 co-acts with both (non-limited example) two retaining element 204 and two clamping elements 203. Each support structure 202 is configured for co-action with two separate solar panel 202 being positioned on opposite sides of said support structure 202. FIGS. 3a-3e shows a more detailed part of the system 200 as shown in FIGS. 2a-2h wherein the mounting of the solar panel 220 and the retaining element 204 is outlined. The support structure 202 is in the upright position. The support structure 202 is connected to two reinforcing structures 211 which are held by the support fingers 213 of the support structure 202. The reinforcing structure 211 is substantially profiled and is configured for smart co-action with the support fingers 213. In fact, the profiled side of the reinforcing structure 211 form-fittingly engages part of the support structure 202 and its support fingers 213. The lower support fingers 213 are configured for providing direct support for the support structure 211 where the upper support fingers 213 are configured for providing a substantial retaining function. FIG. 3a shows part of the system 200 wherein the solar panel 220 is in a substantially initial position, thereby engaging part of the retaining element 204. This is shown in more detail in FIG. 3b. The retaining element 204 comprises a receiving space 214 configured for receiving at least part of an edge of the solar panel 220. The retaining element 204 also comprises a resilient lip 215 configured for engaging of at least part of the solar panel 220 in a resilient manner. The solar panel 220 is directed towards the receiving space 214. FIGS. 3c and 3d shows that subsequently part of the edge, in particular the frame part of the solar panel 220, is to be positioned behind the resilient lip 215. Part of the solar panel 220 is received within the receiving space 214 as can be seen in FIG. 2d. Part of the solar panel edge 220 engages a retaining surface 216 of the retaining element 204. The support structure 202 comprises two the retaining elements 204 positioned at a distance from another, wherein each retaining element 204 is configured for retaining at least part of an edge of a solar panel 220. The latter can be seen in FIG. 3e.

Figure 4B:
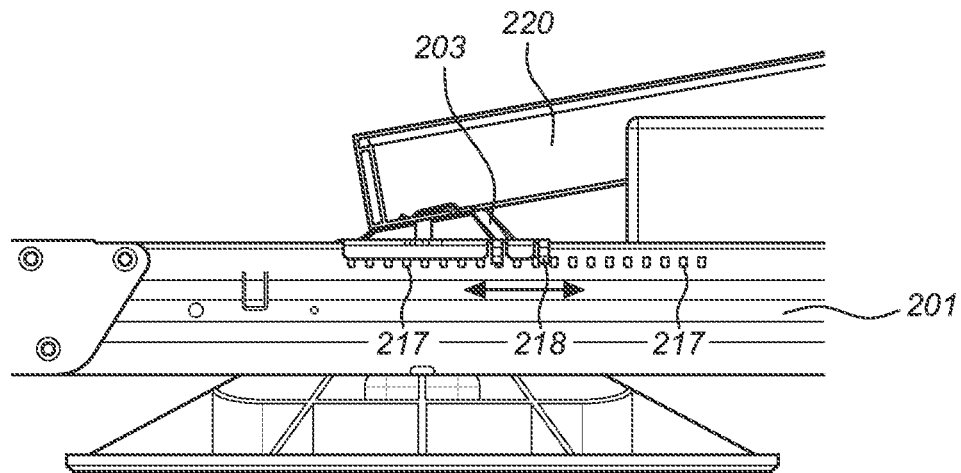
Figure 4C:
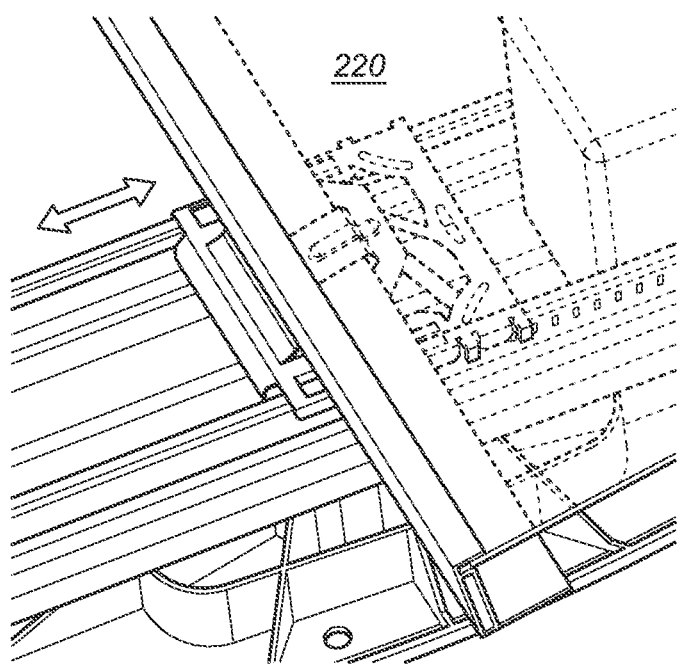

FIGS. 4a-4c shows a more detailed part of the system 200 as shown in FIGS. 2a-2h wherein the mounting of the solar panel 220 and the clamping element 203 is outlined. The base element 201 and the clamping element 203 are mutually displaceable and the clamping element 203 and the base element 201 comprise complementary fastening members 217, 218 configured for fixating at least one mutual position of the base element 201 and the clamping element 203. The complementary fastening members 217, 218 of the base element 201 and the clamping element 203 are in particular configured for providing an interlocking connection. The base element 201 comprises thereto, in the shown embodiment, a plurality of adjacent grooves 217, in particular though holes 217, and the clamping element 203 comprises teeth 218 configured to be received within said grooves 217. The arrows indicate the direction of displacement of the clamping element 203 with respect to the base element 201, or vice versa. The perspective view of FIG. 4c shows that the clamping element 203 substantially encloses the base element 201.

Figure 5A:
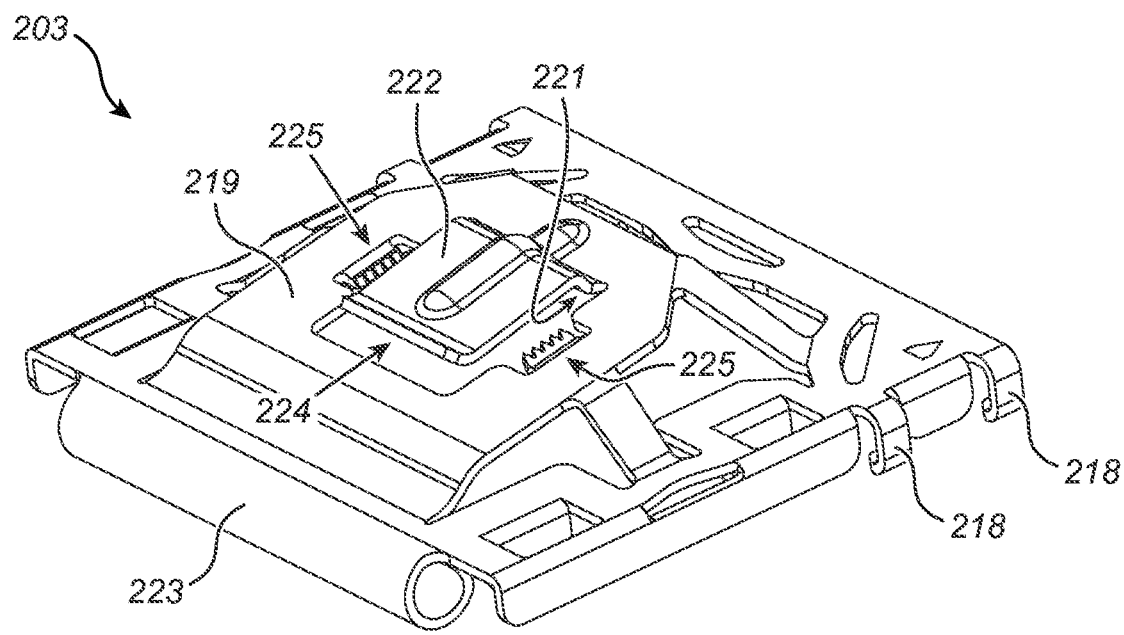
FIGS. 5a-5c a more detailed embodiment of a clamping element according to the present invention.
Figure 5B:
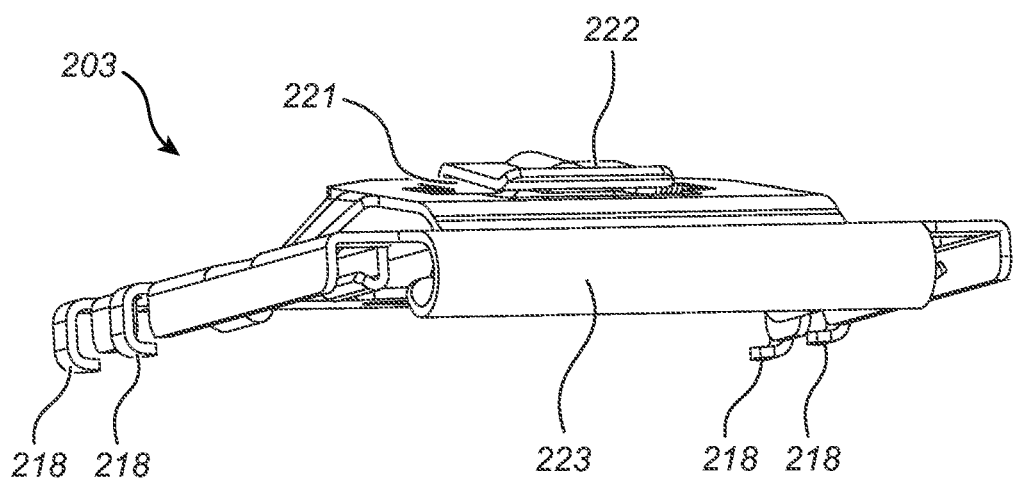
Figure 5C:
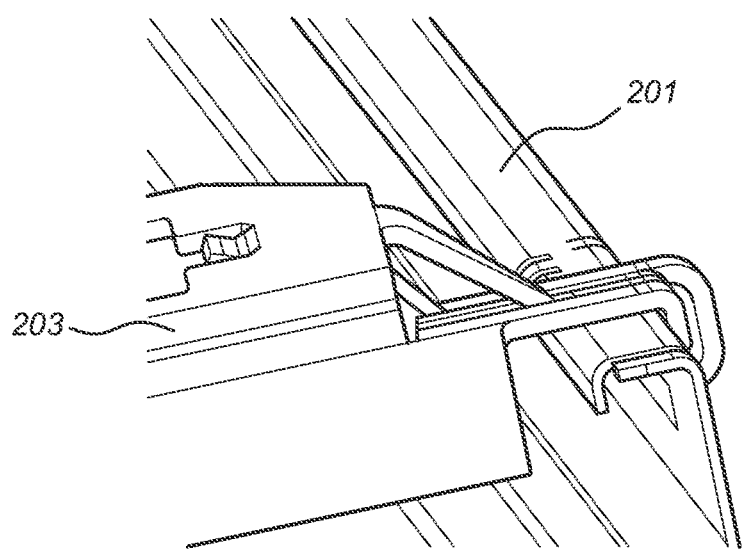

FIGS. 5a-5c show the clamping element 203 as shown in the previous figures in more detail. It can be seen that the clamping element 203 comprises an inclined upper surface 219. This inclined upper surface 219 is configured for engaging at least part of the solar panel (not shown), as can be seen in for example FIGS. 4a-4c. The clamping element 203 further comprises a (second) retaining surface 221 configured to engage at least part of the second edge of the solar panel. The clamping element 203 also comprises a resilient lip 222 configured for engaging of at least part of the solar panel in a resilient manner. This can also be seen more clearly in FIGS. 4a-4c. A receiving space 224 for receiving at least part of the solar panel is substantially defined by the retaining surface 221 and the resilient lip 222. The clamping element 203 is further provided with profiled contact areas 225 configured for providing a restraining effect and/or for providing bonding. In order to enable better manual gripping, the clamping element 203 comprises a gripping element 223 configured for manual gripping. The lower side of the gripping element 223 preferably comprises at least one recess (not shown) for manual engagement. In the shown embodiment, the clamping element 203 comprises two tooth 218 or fastening members 218, on each side. The perspective view of FIG. 4c shows that the clamping element 203 substantially encloses the base element 201. In particular, the clamping element 203 provides double sided engagement of the two side walls of the base element 201. This may enable easier mutual displacement between the clamping element 203 and the base element 201, in particular in a slideable manner. In the shown embodiment, the mutual displacing between the clamping element 203 and the base element 201 is restricted to displacement in the longitudinal direction of the base element 201.

It will be apparent that the invention is not limited to the working examples shown and described herein, but that numerous variants are possible within the scope of the attached claims that will be obvious to a person skilled in the art.

Terms of relative position, such as "upper" and "lower", as used in this patent document are, for clarity reasons only, based on a conventional orientation of the assembly according to the invention when mounted onto a horizontal or diagonal (inclined) roof, regardless of the actual orientation of the assembly.

The system according to the invention can also be referred to as a framework. Within the scope of the present invention, substantially flat mounting surfaces include plane (horizontal) surfaces or (slightly) inclined (diagonal) or profiled surfaces, such as roof surfaces, wall surfaces (vertical surfaces) or ground surfaces.

The invention claimed is:

1. A system for mounting at least one solar panel to a mounting surface, the system comprising:
　at least two base elements configured to be positioned upon the mounting surface, the at least two base elements being connected to one another via a hinge, wherein at least one of the at least two base elements is configured to be folded over the other,
　wherein each base element comprises at least one support structure configured for supporting at least part of the at least one solar panel, wherein the at least one support structure is pivotally coupled to a respective base element, such that the at least one support structure and its respective base element are mutually displaceable between at least a collapsed position and an upright position, and wherein the at least one support structure is configured to retain at least part of a first edge of the at least one solar panel,
　wherein each base element comprises at least one clamping element configured for engaging at least part of a second edge of the at least one solar panel,
　wherein at least part of each base element defines an accommodating space configured to receive at least a portion of the respective at least one support structure therein in the collapsed position, and
　wherein the at least one clamping element is displaceable along a longitudinal axis of its respective base element.

2. The system of claim 1, further comprising at least one locking element for locking the at least two base elements and their respective at least one support structures in at least the upright position.

3. The system of claim 2, wherein the at least one locking element is a locking pin.

4. The system of claim 1, wherein the accommodating spaces are configured to receive at least a portion of the respective at least one support structure therein in the upright position.

5. The system of claim 1, wherein the at least one support structures comprise at least one retaining element configured to retain the first edge of the at least one solar panel.

6. The system of claim 5, wherein the accommodating spaces are configured to receive at least a portion of a respective at least one retaining element therein.

7. The system of claim 1, wherein the accommodating spaces are configured to receive at least part of a respective at least one clamping element therein.

8. The system of claim 1,
　wherein the at least one support structures comprise one support structure, and
　wherein the at least one clamping elements comprise two clamping elements.

9. A system for mounting at least one solar panel to a mounting surface, the system comprising:
　at least one base element configured to be positioned upon the mounting surface, the at least one base element comprising two base element parts that are connected via at least one first hinge, the two base element parts being folded over each other such that the at least one base element is displaceable between a folded position and an extended position, wherein the two base element parts comprise a first base element part and a second base element part;
　at least one support structure configured for supporting at least part of the at least one solar panel, wherein the at least one support structure is pivotally coupled to the at least one base element, such that the at least one support structure and the at least one base element are mutually displaceable, wherein the at least one support structure is configured to retain at least part of a first edge of the at least one solar panel, and wherein the at least one support structure comprises a first support structure and a second support structure; and
　at least one clamping element configured for engaging at least part of a second edge of the at least one solar panel, wherein the at least one clamping element is displaceable along a longitudinal axis of at least one of the two base element parts,
　wherein at least a portion of each of the first base element part and the second base element part define an accommodating space configured to receive at least a portion of the at least one support structure therein, and
　wherein in the folded position, the accommodating space of the first base element part is configured to receive at least a portion of the first support structure and at least a portion of the second support structure therein, and the accommodating space of the second base element part is configured to receive at least a portion of the second support structure and at least a portion of the first support structure therein.

10. The system of claim 9, wherein the at least one support structure and at least one base element are mutually displaceable between at least a collapsed position and an upright position, and
　wherein the accommodating space is configured to receive at least a portion of the support structure therein in the collapsed position.

11. The system of claim 10, further comprising at least one locking element for locking the at least one support structure and the at least one base element in at least the upright position.

12. The system of claim 10, wherein the accommodating space is configured to receive at least a portion of the at least one support structure therein in the upright position.

13. The system of claim 12,
　wherein the first base element part and the second base element part are connected via the at least one first hinge, and
　wherein a first support structure is pivotally coupled to the first base element part, and a second support structure is pivotally coupled to the second base element part.

14. The system of claim 13,
　wherein in the extended position, the accommodating space of the first base element part is configured to receive only at least a portion of the first support structure therein, and the accommodating space of the second base element part is configured to receive only at least a portion of the second support structure.

15. The system of claim 9, further comprising at least one foot connected to the at least one base element.

16. The system of claim 15, wherein the at least one support structure is connected to a first side of the at least one base element, and the at least one foot is connected to a second side of the at least one base element opposing the first side.

17. The system of claim 9, wherein the at least one base element comprises a plurality of base elements, the plurality of base elements comprising at least one second hinge configured to connect one base element to another, and
　wherein the at least one support structure comprises a plurality of support structures.

18. The system of claim 9, wherein the at least one base element comprises a first base element and a second base element,
  wherein the at least one support structure comprises at least one first support structure pivotally coupled to the first base element and at least one second support structure pivotally coupled to the second base element, the at least one first support structure and the at least one second support structure being configured to support the at least one solar panel, and
  wherein the system further comprises at least one reinforcing structure configured to be connected to the at least one first support structure and the at least one second support structure.

19. A method of mounting at least one solar panel on a mounting surface using a system, the method comprising the steps of:
  unfolding at least one first base element from a folded position to an extended position, wherein in the folded position, the at least one first base element is folded over at least one second base element, and wherein the at least one first base element and the at least one second base element comprise an accommodating space;
  displacing at least one support structure received within the accommodating space of the at least one first base element from a collapsed position and an upright position, wherein at least two support structures are received within the accommodating space of the at least one first base element, wherein the at least two support structures comprise a first support structure coupled to the first base element and a second support structure coupled to the second base element;
  displacing at least one clamping element along a longitudinal axis of the at least one first base element;
  positioning at least one solar panel onto the at least one support structure, such that at least part of a first edge of the solar panel is retained by the at least one support structure; and
  engaging at least part of a second edge of the at least one solar panel with the at least one clamping element disposed on the at least one first base element,
  wherein the at least one first base element is connected to the at least one second base element by a hinge.

20. The method of claim 19, further comprising the step of fixating the mutual position of the at least one first base element and the at least one clamping element such that the at least one solar panel is clampingly secured within the system.

21. The method of claim 19, wherein the at least one first base element comprises a plurality of first base elements,
  wherein the at least one second base element comprises a plurality of second base elements,
  wherein the at least one support structure comprises a plurality of support structures, and
  wherein the at least one solar panel comprises a plurality of solar panels.

* * * * *